United States Patent [19]

Tanaka

[11] Patent Number: 4,873,961
[45] Date of Patent: Oct. 17, 1989

[54] AIR-FUEL RATIO CONTROL FOR SUPERCHARGED AUTOMOBILE ENGINE

[75] Inventor: Hideki Tanaka, Hiroshima, Japan
[73] Assignee: Mazda Motor Corporation, Hiroshima, Japan
[21] Appl. No.: 177,343
[22] Filed: Apr. 4, 1988
[30] Foreign Application Priority Data
  Apr. 2, 1987 [JP] Japan .................. 62-82004
[51] Int. Cl.⁴ .................... F02D 23/02
[52] U.S. Cl. .................. 123/564; 60/601; 123/492
[58] Field of Search ............ 60/601, 603, 605.1, 60/611; 123/438, 440, 489, 492, 559.3, 564

[56] References Cited

U.S. PATENT DOCUMENTS

| | | | |
|---|---|---|---|
| 2,670,724 | 3/1954 | Reggio | 60/603 X |
| 3,049,865 | 8/1962 | Drayer | 60/601 X |
| 3,568,435 | 3/1971 | May | 60/611 |
| 4,400,944 | 8/1983 | Iwamoto et al. | 60/605.1 |
| 4,561,403 | 12/1985 | Oyama et al. | 123/492 X |
| 4,633,841 | 1/1987 | Matsuura et al. | 123/492 |

FOREIGN PATENT DOCUMENTS 45739 3/1985 Japan .................. 60/601

Primary Examiner—Michael Koczo
Attorney, Agent, or Firm—Wenderoth, Lind & Ponack

[57] ABSTRACT

An air/fuel control system for a supercharged automotive engine includes a supercharger for supercharging air to be supplied to the engine, a detecting device for detecting a plurality of parameters representative of an engine operating condition, an air/fuel ratio regulating unit for adjusting the air/fuel mixing ratio to an arbitrarily chosen predetermined value, and a control unit for controlling the air/fuel ratio regulating unit. The control unit is designed to cause the air/fuel ratio regulating unit to adjust the air/fuel mixing ratio to a predetermined value higher than the stoichiometric value when the detecting device indicates that the engine is in a normal operating condition while the supercharger is operated, and also to adjust the air/fuel mixing ratio to a predetermined value lower than the stoichiometric value when the detecting device indicates that the engine is under an operating condition in which a relatively high engine power output is required.

13 Claims, 6 Drawing Sheets

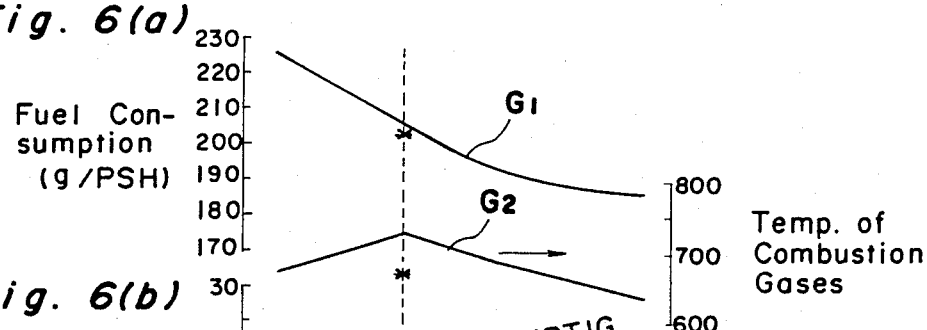
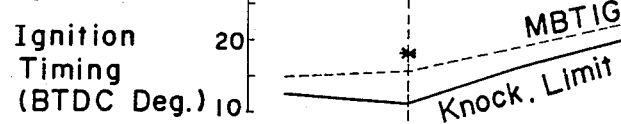
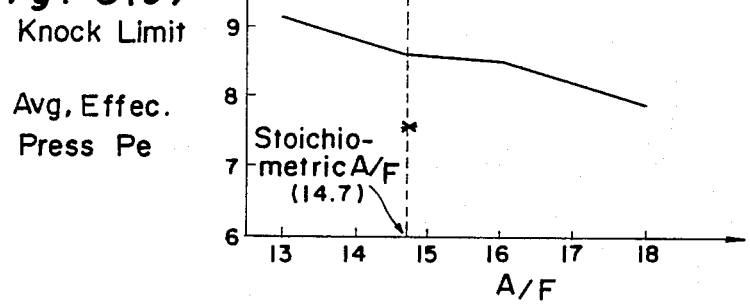
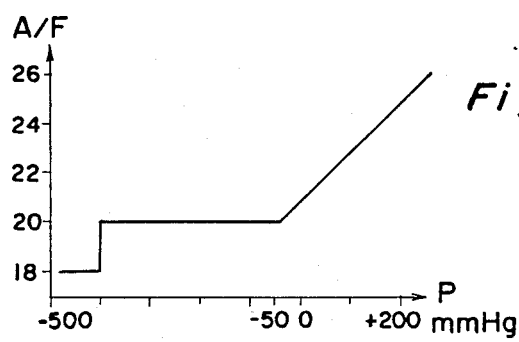
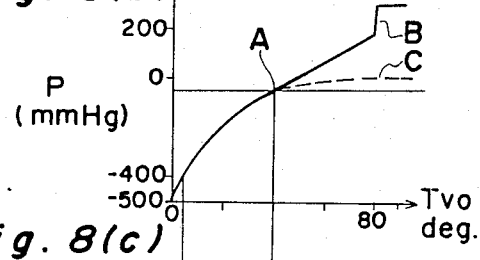
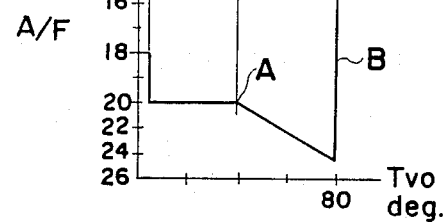

AIR-FUEL RATIO CONTROL FOR SUPERCHARGED AUTOMOBILE ENGINE

CROSS-REFERENCE TO THE RELATED APPLICATIONS

The invention set forth in U.S. patent applications Ser. No. 923,865, filed Oct. 28, 1986, U.S. Pat. No. 4,787,357; Ser. No. 904,622, filed Sept. 8, 1986, U.S. Pat. No. 4,773,377; Ser. No. 14,266, filed Feb. 12, 1987, U.S. Pat. No. 4,763,629; and Ser. No. 42,505, filed Apr. 27, 1987, U.S. Pat. No. 4,727,845, are assigned to the same assignee of the instant application.

BACKGROUND OF THE INVENTION

1. Field of the Invention

The present invention generally relates to an air/fuel control system for automotive vehicles and, more particularly, to the air/fuel control system designed for a supercharged automotive engine to be operated with a combustible mixture having an air/fuel ratio that is higher than the stoichiometric ratio during a particular operating condition of the engine.

2. Description of the Prior Art

In an automotive power plant, it is generally well known that, although the supply of a lean air-fuel mixture, i.e., a combustible mixture having an air/fuel ratio higher than the stoichiometric value, to the automotive engine may bring about a reduction in the engine power output, it brings about a reduction in fuel consumption because of the substantially complete combustion of the mixture taking place in the engine and a reduction in NOx emission because of the lowering of the combustion temperature.

Based on this general notion, Japanese Laidopen Patent Publication No. 57-210137 discloses a so-called "lean-burn engine" provided with an air/fuel control system operable to provide a combustible mixture with an air/fuel ratio of, for example, 17 to 24 which is higher than the stoichiometric value (i.e., 14.7) during a normal practical drive condition when a high engine output is not required, thereby accomplishing the reduction in fuel consumption and also the reduction in NOx emission.

It has, however, been found that, during the practical drive condition of the engine when a relatively high amount of torque is required, the operation of the engine with the lean combustible mixture results in a shortage in engine power. Therefore, it is a general practice that, when the throttle opening attains a value greater than a predetermined value $TV\theta_1$ as shown in the graph of FIG. 11 during the practical drive condition, the air/fuel mixing ratio of the combustible mixture is controlled to, for example, 13.7, which is lower than the stoichiometric value.

In the engine disclosed in the previously mentioned publication, since for a given torque to be produced, the degree of throttle opening is comparatively large when the lean combustible mixture is supplied to the engine, and therefore, the available range ($TV\theta_1$ to WOT shown in the graph of FIG. 11) over which the throttle opening can be adjusted during the drive condition (enriched drive condition) in which the engine is operated with the supply of the enriched combustible mixture is so narrow that, under the engine operating condition in which the throttle opening is greater than the value $TV\theta_1$, an abrupt increase in torque tends to occur with an increase in the degree of throttle opening. Because of this, when the throttle opening attains the value $TV\theta_1$, the torque produced by the engine undergoes an abrupt change as indicated by the point P in the graph of FIG. 11 and torque shocks occur to such an extent that the automobile driver is made uncomfortable.

In order to substantially eliminate the possible occurrence of the torque shocks, a method has been contemplated in which a shift from the lower air/fuel mixing ratio to the higher air/fuel mixing ratio is slowed. However, since, as shown in the graph of FIG. 12, the NOx emission tends to be at a maximum when the air/fuel mixing ratio is within the range of 15 to 16, the slowing of the shift from the lower air/fuel mixing ratio ($L_1$) to the higher air/fuel mixing ratio ($L_2$), when the throttle opening is within the range of, for example, $TV\theta_1$ to $TV\theta_2$, may result the supply of the combustible mixture having an air/fuel mixing ratio within the range of 15 to 16 continuing for a substantial length of time. This means that during such a substantial length of time, the maximum NOx emission takes place, as indicated by a portion R in the curve G in FIG. 11.

SUMMARY OF THE INVENTION

Accordingly, the present invention has been devised to substantially eliminate the above-discussed problems inherent in the prior art air/fuel control systems for automotive vehicles and has as its essential object to provide an improved air/fuel control system wherein, when a relatively low engine power output is required while the engine is in the practical driving condition, a substantial reduction in the fuel consumption and in the NOx emission can be accomplished and, on the other hand, during an engine operating condition in which a relatively high engine power output is required, a required amount of power output can be attained without any torque shock occuring and without incurring any increase in the fuel consumption and in the NOx emission.

To this end, an air/fuel control system herein provided comprises a supercharger for supercharging air to be supplied to the engine, a detecting means for detecting a plurality of parameters representative of an engine operating condition, an air/fuel ratio regulating means for regulating the air/fuel mixing ratio to an arbitrarily chosen predetermined value, and a control means for controlling the air/fuel ratio regulating means. The control means is designed to cause the air/fuel ratio regulating means to adjust the air/fuel mixing ratio to a predetermined value higher than the stoichiometric value when the detecting means indicates that the engine is in a normal operating condition while the supercharger is operated, and also to adjust the air/fuel mixing ratio to a predetermined value lower than the stoichiometric value when the detecting means indicates that the engine is in an operating condition in which a relatively high engine power output is required.

According to the present invention, when the detecting means for detecting the parameters representative of an operating condition indicates that a relatively low engine power output is required while the engine is in the practical driving condition and the throttle is open to a degree not greater than a predetermined degree of throttle opening, the control means causes the supercharger to be inoperative and also causes the air/fuel ratio regulating means to adjust the air/fuel mixing ratio to the predetermined value higher than the stoichiometric mixing ratio 14.7. Accordingly, as is the case with the prior art lean-burn engine, a reduction in the fuel consumption and in the NOx emission can be accomplished.

On the other hand, when the detecting means indicates that a relatively high engine power output is required during the practical driving condition with the throttle open to a degree not smaller than the predetermined value, the control means causes the supercharger to operate and also causes the air/fuel ratio regulating means to adjust the air/fuel mixing ratio to the predetermined value higher than the stoichiometric mixing ratio. Accordingly, the supercharging of the air being supplied to the engine ensures that the high engine power output is generated during the practical driving mode even though the engine is supplied with the lean combustible mixture to which minimized fuel consumption and minimized NOx emission can be attributed.

It is to be noted that, since during the practical driving condition the engine is supplied with the leaned combustible mixture, torque shock, which often occurs in the prior art lean-burn engine, will not substantially occur. Moreover, since, during a high load operating condition in which a higher load is imposed on the engine than that during the practical driving condition, the adjustment of the air/fuel ratio is effected, simultaneously with the supercharging of the air, to be lower than the stoichiometric value and therefore a powerful engine output can be obtained.

BRIEF DESCRIPTION OF THE DRAWINGS

This and other objects and features of the present invention will become clear from the following description taken in conjunction with preferred embodiments thereof with reference to the accompanying drawings, in which:

FIG. 6(a) is a graph showing the the fuel consumption relative to the air/fuel mixing ratio;

FIG. 6(b) is a graph showing the maximum allowed ignition timing determined for avoiding the occurrence of engine knocking relative to the air/fuel mixing ratio;

FIG. 6(c) is a graph showing the average effective pressure relative to the air/fuel mixing ratio.

FIG. 8(a) is a graph showing the change in the air/fuel mixing ratio with a change in suction pressure;

FIG. 8(b) is a graph showing the relationship between the suction pressure and the throttle opening, both controlled according to the flowchart of FIG. 7;

FIG. 8(c) is a graph showing the relationship between the air/fuel mixing ratio and the throttle opening, both controlled according to the flowchart of FIG. 7;

DETAILED DESCRIPTION OF THE PREFERRED EMBODIMENTS

Figure 1:
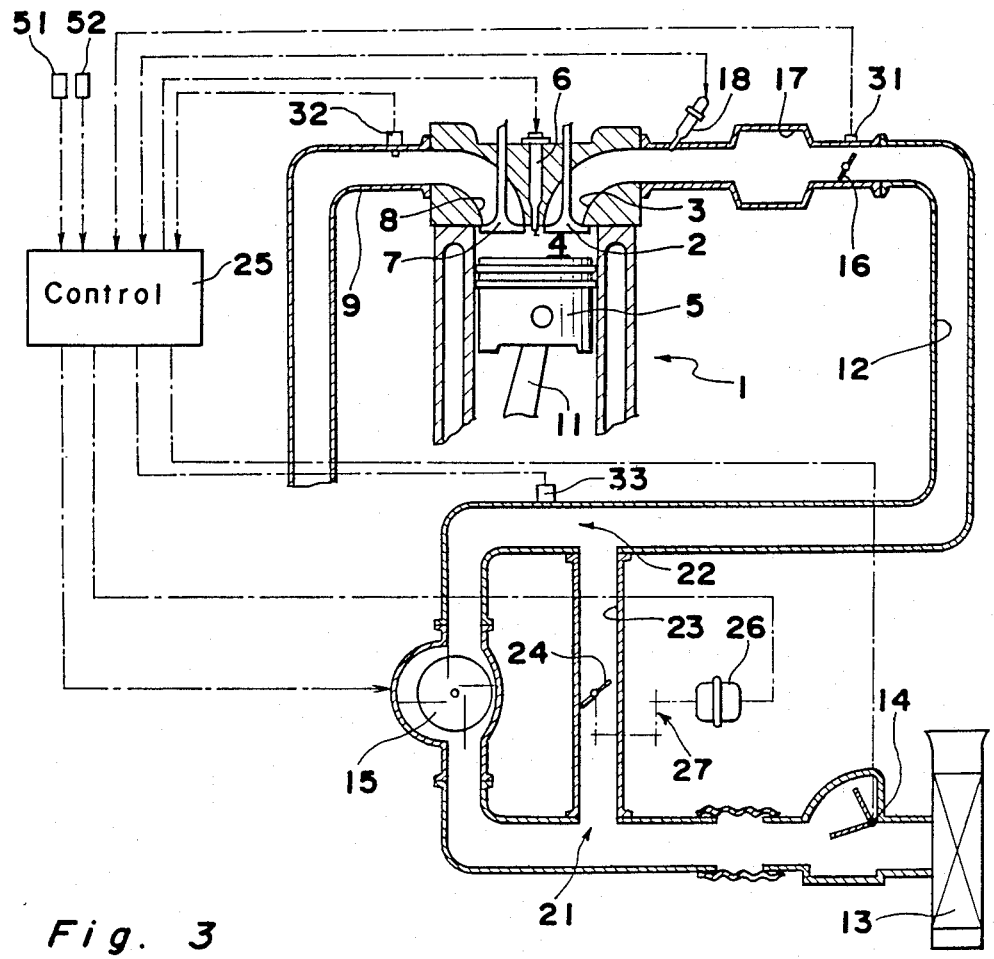
FIG. 1 is a schematic sectional view of an automotive power plant acording to one preferred embodiment of the present invention, in which an engine-driven supercharger is employed.

Before the description of the present invention proceeds, it is to be noted that like parts are designated by like reference numerals throughout the accompanying drawings.

(First Embodiment)

Referring first to FIG. 1, there is shown an automotive power plant which comprises an internal combustion engine 1 having a combustion chamber 4. The combustion chamber 4 has a piston 5 movable up and down within the combustion chamber 4, the movement of the piston 5 being transmitted to a crankshaft (not shown) through a connecting rod 11 for transmitting the linear movement of the piston 5 into rotary motion of the crankshaft. This combustion chamber 4 communicates with a source of combustible air/fuel mixture through an intake port 3 adapted to be selectively closed and opened by an intake valve 2 synchronized with the movement of the piston 5, and also communicates with an exhaust passage 9 through an exhaust port 8 adapted to be selectively opened and closed by an exhaust valve 7 operated generally in a manner opposite to the intake valve 2. The engine 1 has an ignition plug 6 for igniting the combustible mixture, which has been charged into the combustion chamber 4 through the intake port 3 during the opening of the intake valve 2 and has subsequently been compressed by the piston 5. The resultant exhaust gases are subsequently discharged to the exhaust passage 9 through the exhaust port 8 during the opening of the exhaust valve 7. As is well known, the illustrated engine 1 undergoes four strokes facilitating fuel intake, compression, ignition and exhaust during each cycle of operation thereof.

Since the engine 1 having structure so far described is well known, the details thereof will not be reiterated here for the sake of brevity.

The source of combustible mixture comprises a fuel intake system including an intake passage 12 extending between the intake port 2 and an air cleaner 13 open to the atmosphere, an engine-driven, vane-type supercharger 15, and a fuel injector 18 installed in the intake passage 12 in the vicinity of the intake port 3 for injecting into the intake passage 12 fuel which will be subsequently mixed with air to provide the combustible mixture. The intake passage 12 adjacent the air cleaner 13 has an air flowmeter 14 installed in one end thereof for measuring and generating an air flow signal indicative of the flow of air therethrough from time to time, a throttle valve 16 operatively linked with the accelerator pedal (not shown) and disposed inside the intake passage 12 for regulating the flow of air therethrough towards the combustion chamber 4, and an accumulator chamber 17 defined therein at a position between the injector 18 and the throttle valve 16.

The accumulator chamber 17 is designed so that, when a negative pulsating pressure wave developed inside the intake passage 12 in the vicinity of the intake port 3 generated upon the opening of the intake valve 2 flows backwards into the intake passage 12, the negative pulsating pressure wave can be converted into a positive pressure wave which is then transmitted to the combustion chamber 4 at about the end of the suction stroke thereby effecting pressurization of the combustible mixture utilizing an inertia effect.

The fuel intake system also includes a bypass passage 23 bypassing the supercharger 15 and having its opposite ends connected at 21 to a portion of the intake passage 12 between the supercharger 15 and the air flowmeter 14 and at 22 to a portion of the intake passage 12 between the supercharger 15 and the throttle valve 16. The bypass passage 12 has a control valve 24 disposed therein for selectively opening and closing the bypass passage 23, which control valve 24 may be a butterfly valve, e.g., having a structure similar to that of the well known throttle valve 16. This control valve 24 is operatively connected through a suitable linkage system 27 to an actuator 26 adapted to receive a command from a control unit 25 as will be described later.

The illustrated power plant makes use of various sensors including a throttle sensor 31 disposed on the intake passage 12 for detecting, and providing a throttle signal indicative of, the opening of the throttle valve 16, an oxygen sensor 32 disposed on the exhaust passage 9 for detecting, and providing a ratio signal indicative of, the amount of oxygen contained in the exhaust gases emitted from the engine 1, a suction pressure sensor 33 disposed on a portion of the intake passage 12 between the supercharger 15 and the junction 22 for detecting, and providing a suction pressure signal indicative of the pressure of the air being supplied to the engine 1, an engine speed sensor 51 for detecting and providing a speed signal indicative of the engine speed, and an atmospheric pressure sensor 52 for detecting and providing a pressure signal indicative of the atmospheric pressure prevailing in the environment in which the engine 1 is operated. It is to be noted that, as is well known to those skilled in the art, the detection of the amount of oxygen contained in the exhaust gases can provide an indication of the air/fuel mixing ratio of the combustible mixture which has been supplied into and has been burned in the combustion chamber 4.

The throttle signal from the throttle sensor 31, the ratio signal from the oxygen sensor 32, the suction pressure signal from the suction pressure sensor 33, the speed signal from the engine speed sensor 51 and the pressure signal from the atmospheric pressure sensor 52 are all inputted to the control unit 25. The control unit 25 is designed to process these input signals to provide various commands necessary to control the engine speed, the air/fuel mixing ratio and the supercharged pressure in a manner which will now be described.

Figure 3:
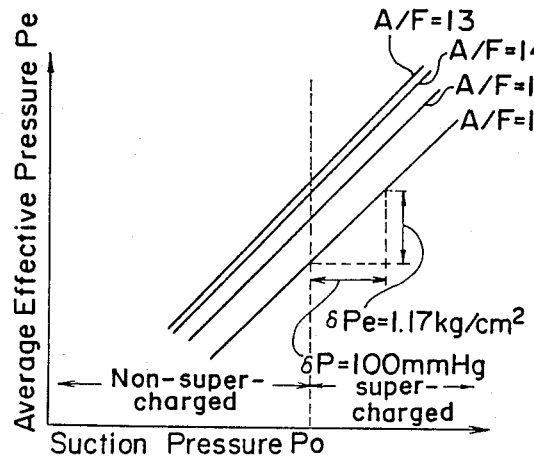
FIG. 3 is a graph illustrating the relationship between the average effective pressure and the suction pressure.
Figure 4:
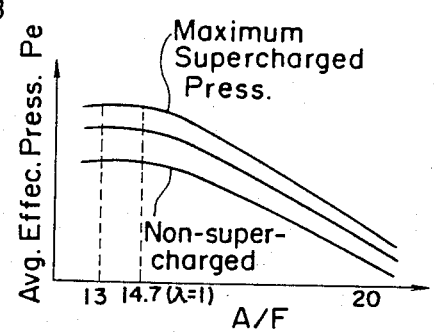
FIG. 4 is a graph illustrating the relationship between the average effective pressure and the air/fuel mixing ratio.

The supercharged pressure and the air/fuel mixing ratio are both controlled by the control unit 25 to ensure a reduction in fuel consumption and also in NOx emission, and the necessary engine power output depends on the operating condition of the engine characteristics of the suction pressure P (or the supercharged suction pressure when the supercharger 15 is operated) and of the air/fuel mixing ratio A/F relative to an average effective pressure Pe (i.e., the engine power output) of the engine 1 which provide the basis for the control performed by the control unit 25 are illustrated in FIGS. 3 and 4, respectively.

Referring to FIG. 3, if the air/fuel mixing ratio is any one of the constant ratios shown therein, the average effective pressure Pe increases as a linear function of the suction pressure P and the gradient of the linear function is substantially the same for all of the illustrated ratios. This gradient is, when the air/fuel mixing ratio is 18, expressed as follows.

$$\delta Pe/\delta P = 1.17 \text{ (kg/cm}^2\text{)}/100 \text{ (mmHg)}.$$

On the other hand, if the suction pressure is fixed, the average effective pressure Pe abruptly decreases with the leanness of the combustible mixture, that is, with an increase of the air/fuel mixing ratio, as shown in the graph of FIG. 4.

A control program according to which the control unit 25 can perform its control function is prepared in consideration of such characteristics as shown in and discussed with reference to FIGS. 3 and 4.

Figure 5A:
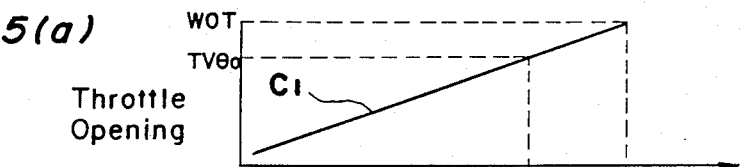
FIG. 5(a) is a graph illustrating the throttle opening relative to the suction pressure.
Figure 5B:
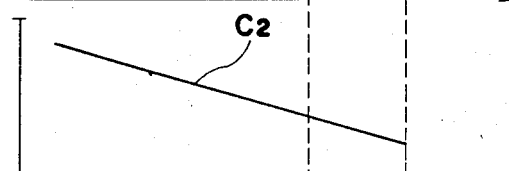
FIG. 5(b) is a graph illustrating the ignition timing relative to the suction pressure.

The relationship between the throttle opening and the suction pressure, which is exhibited when the supercharged suction pressure and the air/fuel mixing ratio are to be controlled by the control circuit 25 is represented by a line $C_1$ in FIG. 5(a). It should be noted that the higher the suction pressure, the more frequent the engine knocking, and therefore the ignition timing is retarded with an increase of the suction pressure as shown by a line $C_2$ in FIG. 5(c) to prevent such knocking.

When the throttle is opened to a degree not greater than a predetermined value TV$\theta$o, no relatively high engine power output is required and, therefore, the supercharger 15 is not operated. At this time, the control valve 24 in the bypass passage 23 is held in a full open position thereby permitting the air entering the intake passage 12 through the air cleaner 13 to flow through the bypass passage 23 while bypassing the supercharger 15. During such a non-supercharged operating condition, the air/fuel mixing ratio is adjusted to a value of, for example, 18 which is higher than the stoichiometric value of 14.7 for reducing fuel consumption. Characteristics of the fuel consumption relative to the air/fuel mixing ratio are such that, as shown by a line $G_1$ in the graph of FIG. 6(a), for example, at WOT (during supercharging) the fuel consumption decreases with an increase in the air/fuel mixing ratio. Also, characteristics of the combustion temperature relative to the air/fuel mixing ratio are such that, as shown by the bent line $G_2$ in the graph of FIG. 6(a), the combustion temperature tends to be lowered considerably with an increase in the air/fuel mixing ratio and, therefore, the NOx emission can be considerbly reduced.

The control of the air/fuel mixing ratio can be accomplished by varying the pulse width of fuel injection pulses, applied to the injector 18 from the control unit 25, in dependence on the amount of air detected by the air flowmeter 14. In this way, during a period in the practical driving when the supercharger 15 is not operated, the lean combustible mixture is supplied to the engine, thereby contributing to a reduction in fuel consumption and to a reduction in NOx emission as in the prior art lean-burn engine.

On the other hand, when the throttle opening exceeds the predetermined value TV$\theta$o, during the practical driving condition, a relatively high engine power output is required. Under this condition, therefore, the supercharger 15 is operated to supercharge the suction air. Simultaneously therewith, the control valve 24 is controlled by the control unit 25 by way of the actuator 26 to regulate the recirculating flow of the supercharged suction air from the junction 22 to the junction 21 through the bypass passage 23 so that the supercharged suction air actually supplied to the engine 1 can attain a target value. In other words, the supercharged air is subjected to a so-called feedback control. The target value to which the supercharged air is regulated under the feedback scheme described above is so selected as to increase with an increase in the degree of throttle opening; however, the target value is adjusted to even a higher value during the acceleration of the engine as will be described later.

Figure 5C:
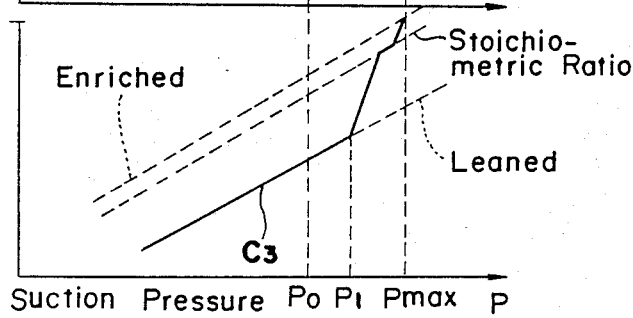
FIG. 5(c) is a graph illustrating the average effective pressure relative to the suction pressure.

When the supercharging of the suction air is effected while the degree of throttle opening has exceeded the predetermined value TV$\theta$o, and under an engine operating condition in which the suction pressure during supercharging is not higher than a predetermined value $P_1$ shown in the graph of FIG. 5(c), the air/fuel mixing ratio is controlled to a high value as is the case during the non-supercharging period. Since the suction pressure is not higher than the predetermined value $P_1$ under the practical driving condition and no higher engine output is therefore required, the engine is operated with the supply of the lean combustion mixture while the suction air is supercharged by the supercharger 15. By doing so, the reduction in the fuel consumption and in the NOx emission can be attained while the necessary engine power output is secured.

However, a relatively high engine power output may be required even though the engine is operated with the lean combustible mixture simultaneously with the supercharged suction air, that is, while the supercharger 15 is in operation. This occurs when the engine is accelerated, during which occasion the air/fuel mixing ratio is adjusted based on the acceleration of the engine. More specifically, when the engine is moderately accelerated while operated with supercharged suction air and the lean combustible mixture, the air/fuel mixing ratio is maintained, but the suction pressure is increased for a predetermined length of time thereby increasing the engine power output. On the other hand, when the engine is normally accelerated, the air/fuel mixing ratio of the combustible mixture is adjusted to the stoichiometric value without the suction pressure being changed. When the engine is rapidly accelerated, however, the suction pressure is increased and, at the same time, the air/fuel mixing ratio is decreased to a value lower than the stoichiometric value.

It is to be noted that, although knocking tends to occur easily during supercharging, characteristics of the ignition timing, required to avoid the occurrence of engine knocking, and the average effective pressure relative to the air/fuel mixing ratio can be established as illustrated in FIGS. 6(b) and 6(c), respectively.

As shown in the graphs of FIGS. 6(b) and 6(c), the average effective pressure at the knocking limit decreases with an increase of the air/fuel mixing ratio, and therefore, it is desirable that countermeasures for preventing engine knocking be taken such as, for example, the use of a cooling system for cooling the suction air being supplied to the engine 1.

High engine power output such as that required during the rapid acceleration of the engine is also required when the automotive vehicle is driven up an incline. If during such acceleration or ascent the lean combustible mixture were to be supplied to the engine 1, the required high engine power output could not be obtained, and, therefore, the air/fuel mixing ratio should be increased to a value higher than the stoichiometric value in dependence on the suction pressure. By way of example, referring to the graph of FIG. 5(c), the target value to which the air/fuel mixing ratio is controlled is so selected that, when the suction pressure P attains a predetermined value $P_2$ which is higher than the value $P_1$, the air/fuel mixing ratio is adjusted to the stoichiometric value of 14.7, but when the suction pressure P attains the maximum suction pressure Pmax, the air/fuel mixing ratio is adjusted to 13.

When the control is carried out in the manner hereinbefore described, the average effective pressure Pe (the engine power output) relative to the suction pressure corresponds to a bent line $C_3$ in the graph of FIG. 5(c). Since the throttle opening TV$\theta$ and the suction pressure have a linear relationship as shown by the $C_1$ in the graph of FIG. 5(a), characteristics of the engine power output relative to the throttle opening will be similar to those represented by the bent line $C_3$ in the graph of FIG. 6(c).

(Second Embodiment)

In describing the previous embodiment of the present invention, reference has been made to the use of an engine-operated, vane-type supercharger. However, in the embodiment which will now be described with reference to FIG. 2, a turbocharger, that is, a supercharger driven by the exhaust gases flowing through the exhaust passage 9 is employed as generally identified by 40.

The turbocharger 40 comprises a turbine 40a, disposed in the exhaust passage 9 and adapted to be driven by the flow of the exhaust gases, and a compressor or blower 40b coupled with the turbine 40a through a connecting shaft 40c.

Figure 2:
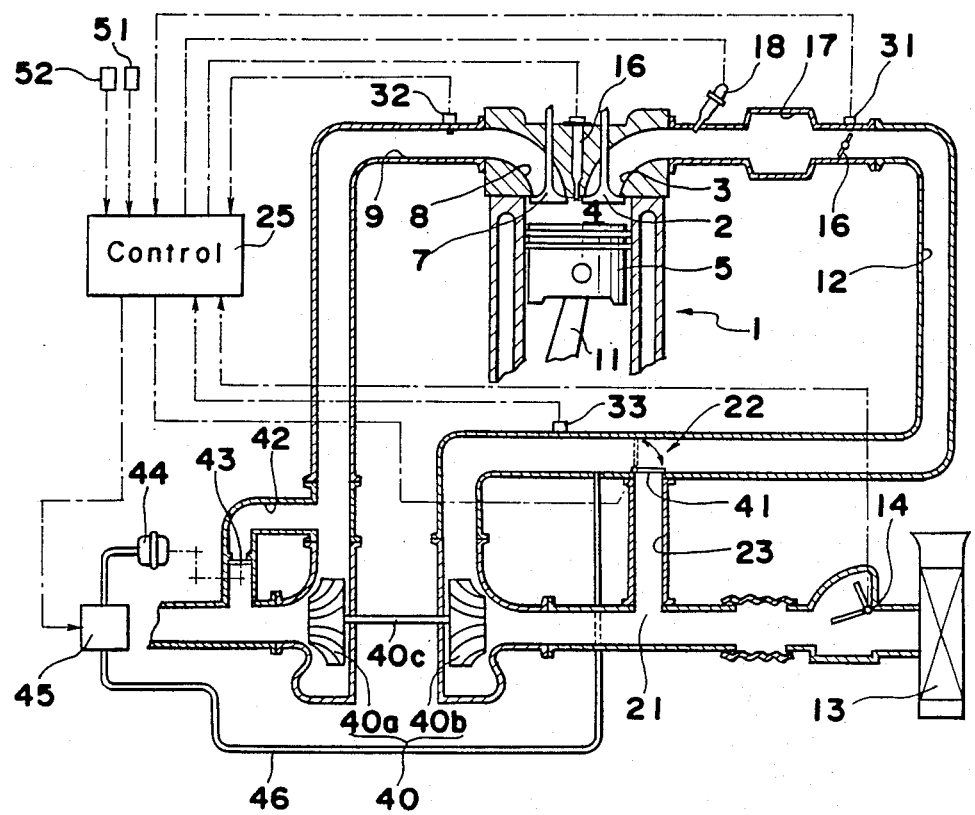
FIG. 2 is a schematic sectional view of the automotive power plant according to another preferred embodiment of the present invention, in which an exhaust-driven supercharger, that is, a turbocharger is employed.

As shown in FIG. 2, the exhaust passage 9 has a bypass passage 42 bypassing the turbine 40a and having a waste gate valve 43 disposed inside the bypass passage 42 for regulating the flow of the exhaust gases bypassing the turbine 40a. This waste gate valve 43 is adapted to be controlled through any suitable linkage by an actuator 44 which may be a diaphragm valve. The actuator 44 is in turn controlled by an electromagnetic valve 45 operable to regulate the actuator 44 with a portion of the pressure prevailing inside a portion of the suction passage 12 between the blower 40b and the junction 22, the opening of said electromagnetic valve 45 being controlled in response to a command issued from the control unit 25. For this purpose, a positive pressure introducing passage 46 extends between the electromagnetic valve 45 and the portion of the suction passage 12 between the blower 40b and the junction 22.

Thus, it will readily be seen that the opening of the waste gate valve 43 can be controlled by the pressure inside that portion of the suction passage 12 in response to the command issued from the control unit 25.

Instead of the control valve 24 shown in FIG. 1 and described as disposed inside the bypass passage 23, and its associated actuator 26, a pivotally supported gate valve 41 is disposed at the junction 22, which gate valve 41 is controlled by a command from the control unit 25 so as to assume one of a first position, at which the bypass passage 23 is closed as shown by the solid line, and a second position at which the bypass passage 23 is open and the flow of the supercharged air into the portion of the suction passage 12 between the junction 22 and the engine 1 is blocked as shown by the phantom line. Specifically, the gate valve 41 is in the second position, shown by the phantom line, when the turbocharger 40 is inoperative, allowing the air to be supplied through the bypass passage 23 to that portion of the suction passage 12 between the junction 22 and the engine 1.

The automobile power plant shown in and described with reference to FIG. 2 operates in a manner similar to that shown in and described with reference to FIGS. 1 to 6, and accordingly, the details thereof will not be reiterated for the sake of brevity.

Hereinafter, some of the control programs according to which the control unit 25 is programmed to operate will be described with reference to FIGS. 7 to 10.

(Program I)

Figure 7:
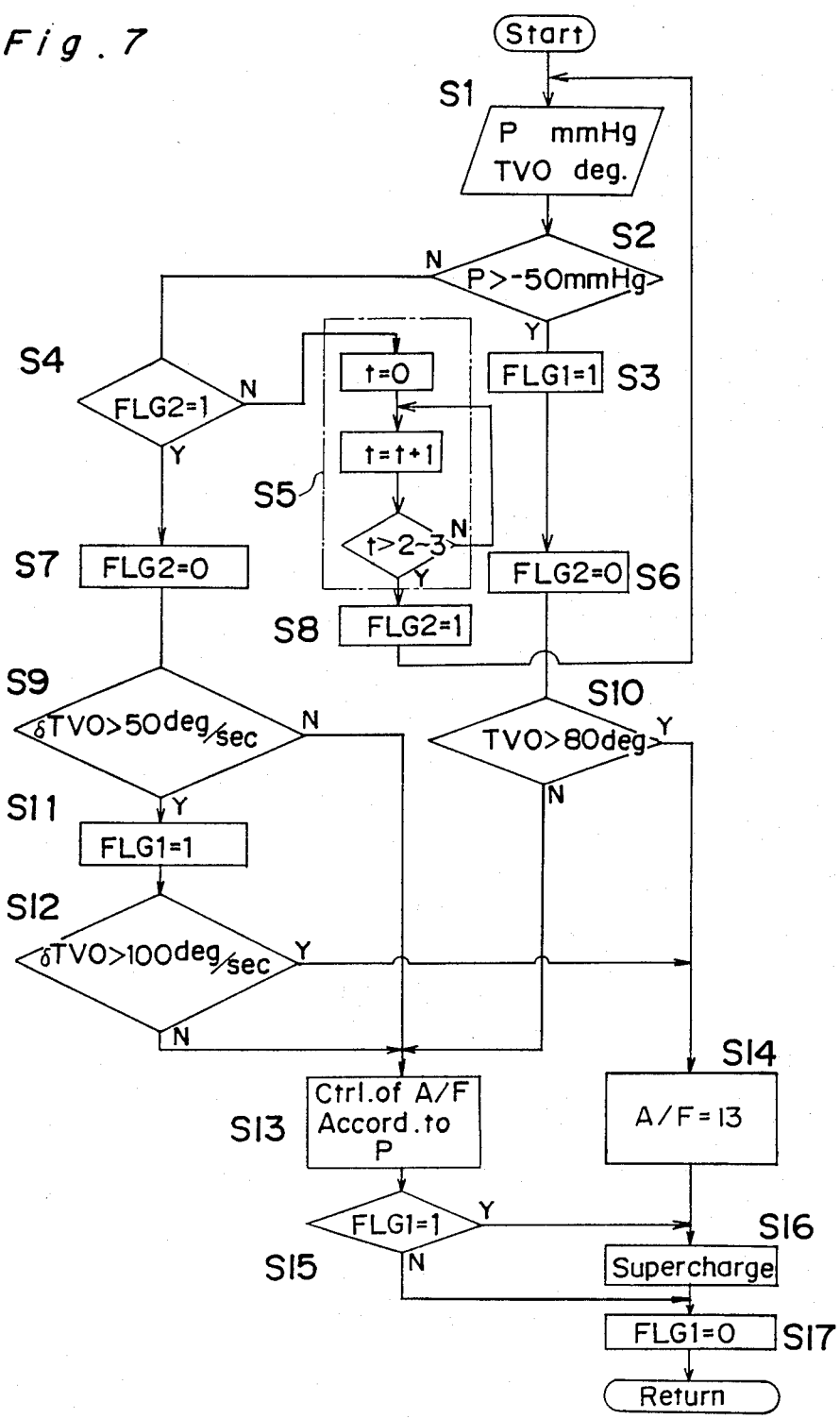
FIG. 7 is a flowchart showing one preferred sequence of control steps performed by a control means used in any one of the embodiments of the present invention.

A first preferred form of the control program is shown in FIG. 7 and will be described on a step-by-step basis.

Step S1: Subsequent to the start of the program, the suction pressure signal from the suction pressure sensor 33 and the throttle signal from the throttle sensor 31 are inputted to the control unit 25 to determine the suction pressure P.

Step S2: A decision is made to determine if the suction pressure P is higher than a predetermined value of $-50$ mmHg.

Step S3: If the suction pressure is higher than the predetermined value as determined at Step S2, Step S3 takes place, in which a flag is set to FLG1=1 indicates that supercharging should be carried out.

Step S4: If the suction pressure is lower than the predetermined value as determined at Step S2, Step S4 takes place. In other words, when the suction pressure is lower than the predetermined value, and is clearly so as a result of Step S5 at which a time delay is generated before another determination is made that the suction pressure is not greater than the predetermined value at Step S2, the next control Step S7 is executed.

Step S5: Only when t is greater than 2 to 3, that is, after a delay of about 2 to 3 seconds, will the program proceed from Step S5 to Step S8.

Step S6: The setting of FLG2=0 at Step S6 occurs when the suction pressure is greater than the predetermined value and supercharging is to be effected.

Step S7: The setting of FLG2=0 at Step S7 occurs when the suction pressure is not yet greater than the predetermined value and supercharging has yet to have been set in the program to be carried out.

Step S8: The setting of FLG2=1 at Step S8 causes the control program to proceed to Step S9 after the delay generated at Step S5 and P is ensuredly not greater than $-50$ mmHg.

Step S9: A decision is made to determine if the change in throttle opening $\delta TV0$ is higher than a first predetermined value of 50 degrees per second.

Step S10: A decision is made to determine if the throttle opening TV0 is greater than a predetermined value of 80 degrees.

Step S11: If the change in throttle opening $\delta TV0$ is higher than the predetermined value as determined at Step S9, FLG1=1 is set to indicate that supercharging is to be effected.

Step S12: A decision is made to determine if the change in throttle opening $\delta TV0$ is higher than a second predetermined value of 100 degrees per second.

Step S13: If the change in throttle opening $\delta TV0$ as determined either at Step S9 or at Step S12 is lower than the respective predetermined values, or if the throttle opening TV0 as determined at Step S10 is smaller than the predetermined value, this step takes place to adjust the air/fuel mixing ratio to a value based on the current suction pressure P as shown in the graph of FIG. 8(a).

Step S14: If the change in throttle opening $\delta TV0$ as determined at Step S12 is higher than the predetermined value, or if the throttle opening TV0 as determined at Step S10 is greater than the predetermined value, this step takes place to adjust the air/fuel mixing ratio to a value of 13.

Step S15: A decision is made to determine if supercharging should be carried out after the suction pressure has been adjusted.

Step S16: Either subsequent to Step S14 or if FLG1=1 is confirmed at Step S15, this step takes place to bring the supercharger 15 into operation.

Step S17: Either subsequent to the start of operation of the supercharger 15 effected at Step S16 or if FLG1=1 is not confirmed at Step S15, this step takes place and the program flow returns.

As a result of the foregoing program flow, the suction pressure P and the air/fuel mixing ratio A/F can be controlled in the manner shown in FIGS. 8(b) and 8(c), respectively. In FIGS. 8(b) and 8(c), point A represents the start of the supercharging of the suction air, point B represents a kick down region, and point C represents a region in which no supercharging is effected.

The program flow shown in and described with reference to FIG. 7 is featured in that, the supercharging region exclusive of the kick-down region (i.e., when TV0 is greater than 80 degrees) represents when the lean combustible mixture is supplied to the engine while the supercharger 15 is operated so that an air/fuel mixing ratio having a high value is supplied under the occurrence of supercharged suction pressure and, on the other hand, the non-supercharging region represents when the lean combustible mixture is supplied to the engine during moderate acceleration while the supercharger 15 is operated, or the enriched combustible mixture is supplied to the engine during rapid acceleration while the supercharger 15 is operated.

(Program II)

Figure 9:
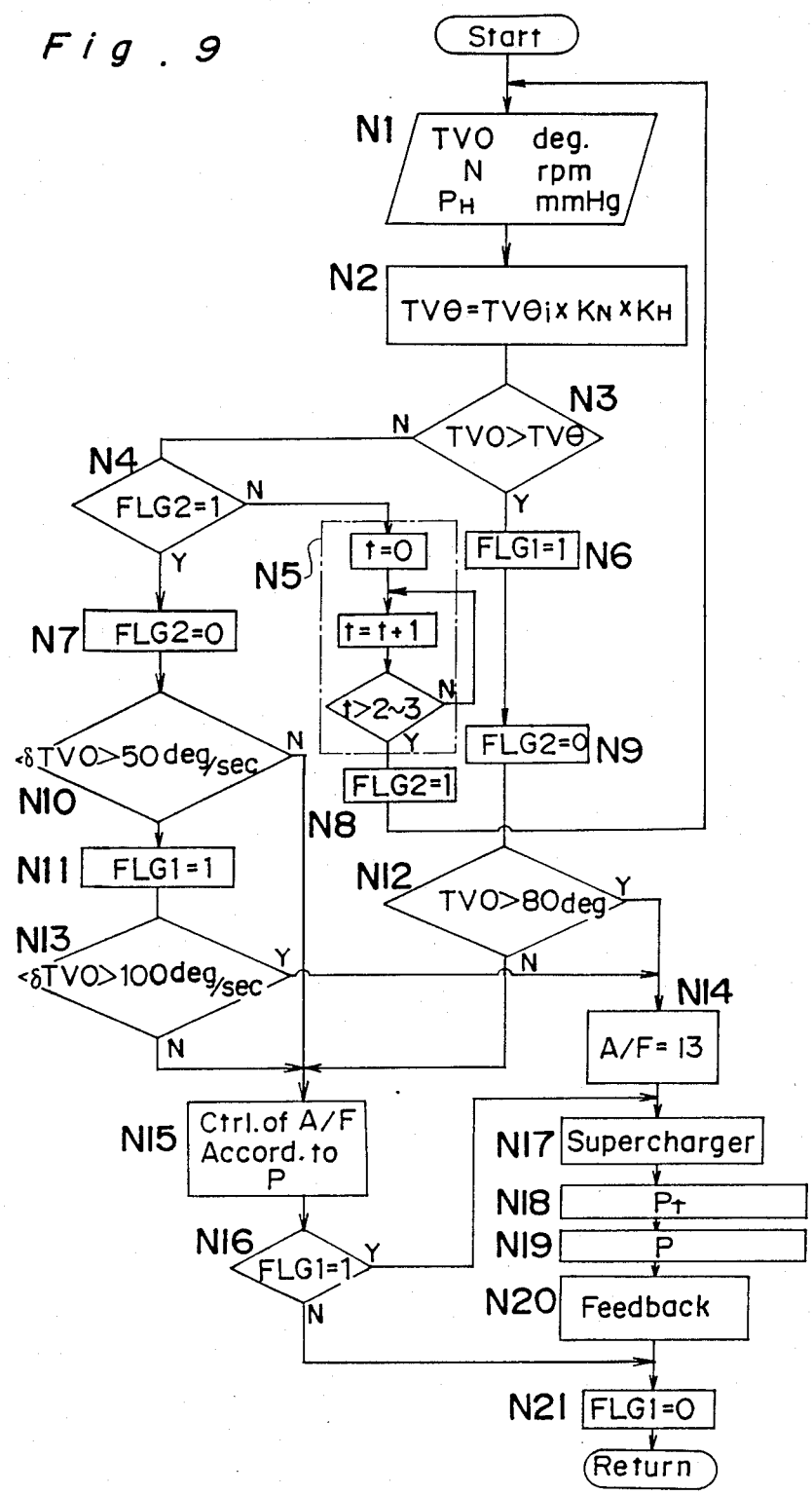
FIG. 9 is a flowchart showing another preferred sequence of control steps performed by the control means.

A second preferred form of the control program is shown in FIG. 9 will be described on a step-by-step basis.

Step N1: Subsequent to the start of the program, the throttle signal from the throttle sensor 31, the speed signal from the engine speed sensor 33 and the pressure signal from the atmospheric pressure sensor 52 are inputted to the control unit 25.

Figure 10A:
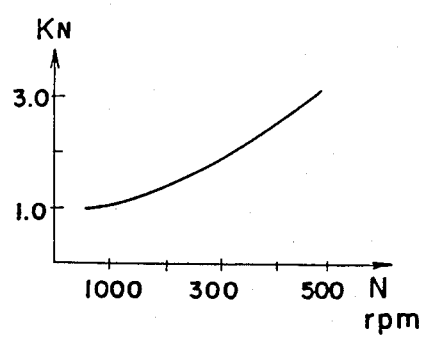
FIG. 10(a) is a characteristic curve showing the relationship between the speed correcting coefficient and the engine speed.
Figure 10C:
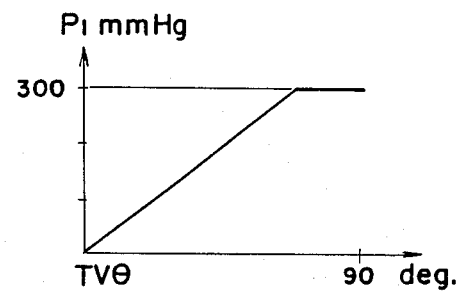
FIG. 10(c) is a characteristic curve showing the relationship between the suction pressure and the throttle opening.
Figure 10B:
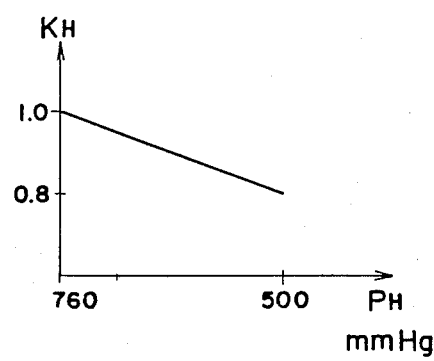
FIG. 10(b) is a characteristic curve showing the relationship between the throttle opening correcting coefficient and the suction pressure.
Figure 12:
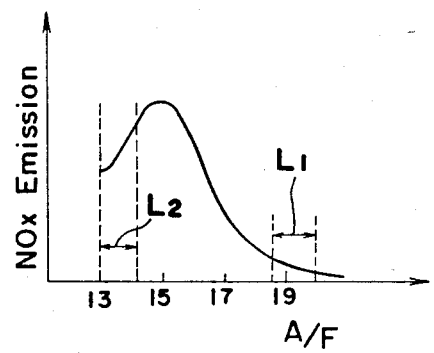
FIG. 12 is a graph showing the change in NOx emission relative to the air/fuel mixing ratio.
Figure 11:
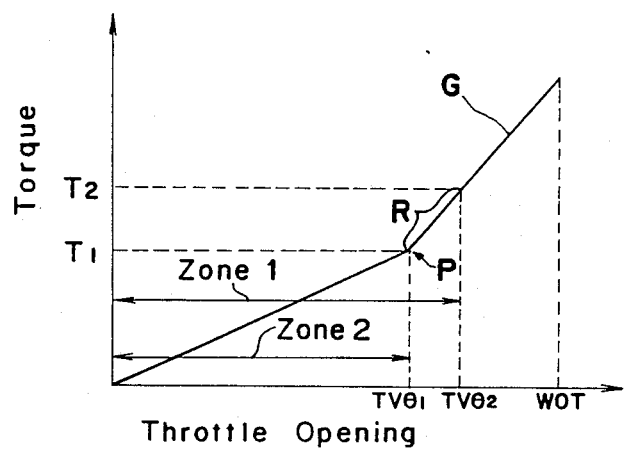
FIG. 11 is a graph showing the change in torque relative to the throttle opening exhibited by the prior art lean-burn engine.

Step N2: An equation $TV\theta = TV\theta i \times K_N \times K_H$ is calculated to determine the value of the throttle opening TV0 at which supercharging is to be initiated. In this equation, $TV\theta i$ represents the throttle opening during idling of the engine, $K_N$ represents a correction coefficient for the throttle opening which is determined with reference to the engine speed as shown in FIG. 10(a), and $K_H$ represents a correction coefficient for the atmospheric pressure determined with reference to the pressure $P_h$ as shown in FIG. 10(b).

Step N3: A decision is made to determine if the throttle opening TV0 is greater than the throttle opening $TV\theta$.

Step N4: If the throttle opening TV0 is not greater than the throttle opening $TV\theta$ as determined at Step N3, this step takes place to determine if an appropriate delay at Step N5 has occurred.

Step N5: Only when t is greater than 2 to 3, that is, after a delay of about 2 to 3 seconds, will the program proceed from Step N5 to Step S8.

Step N6: If the throttle opening TV0 is greater than the throttle opening $TV\theta$ as determined at Step N3, this step takes place. FLG1=1 is set to indicate that the supercharging should be carried out.

Step N7: FLG2=0 is set when the throttle valve opening is greater than $TV\theta$ and supercharging is to be carried out.

Step N8: FLG2=1 is set after the delay generated at Step N5 which causes the program to proceed to Step N10 when it is assured that TV0 is not greater than $TV\theta$.

Step N9: FLG2=0 is set when TV0 is appropriately greater than the value $TV\theta$ and supercharging is to be carried out.

Step N10: A decision is made to determine if the change in throttle opening $\delta TV0$ is higher than a first predetermined value of 50 degrees per second.

Step N11: FLG=1 is set to indicate that supercharging should be effected.

Step N12: A decision is made to determine if the throttle opening TV0 is greater than a predetermined value of 80 degrees.

Step N13: A decision is made to determine if the change in throttle opening $\delta TV0$ is higher than a second predetermined value of 100 degrees per second.

Step N14: If the change in throttle opening $\delta TV0$ as determined at Step N13 is higher than the second predetermined value, or if the throttle opening TV0 as determined at Step N12 is greater than the predetermined value, this step takes place to adjust the air/fuel mixing ratio to a value of 13.

Step N15: If the charge in throttle opening $\delta TV0$ as determined either at Step N10 or at Step N13 is lower than the respective predetermined values, or if the throttle opening TV0 as determined at Step N12 is smaller than the predetermined value, this step takes place to adjust the air/fuel mixing ratio to a value based on the current suction pressure P as shown in the graph of FIG. 8(a).

Step N16: A decision is made to determine if the program has indicated that the supercharger should be operated.

Step N17: Either subsequent to Step N14 or if the decision made at Step N16 had indicated that the supercharger 15 should be operated, this step takes place to initiate the operation of the supercharger 15.

Step N18: The target supercharger pressure $P_T$ is inputted according to the characteristic curve shown in FIG. 10(c) showing the relationship between the pressure $P_T$ and the throttle opening $TV\theta$.

Step N19: the suction pressure P is inputted.

Step N20: The feedback control is carried out to bring the supercharged suction pressure to the target value.

Step N21: Either subsequent to Step N20 or if FLG1=1 is not confirmed at Step N16, this step takes place and the program flow returns.

Although as a result of the foregoing program flow, the suction pressure P and the air/fuel mixing ratio A/F can be controlled in the manner shown in FIGS. 8(b) and 8(c), respectively, the program flow shown in FIG. 9 is featured in that the supercharged suction pressure can be controlled in dependence on the throttle opening.

Although the present invention has fully been described in connection with the preferred embodiments thereof with reference to the accompanying drawings, it is to be noted that various changes and modifications will become apparent to those skilled in the art. Such changes and modifications are, unless they depart from the scope of the present invention as defined by the appended claims, to be understood as included therein.

I claim:

1. An air/fuel control system of a supercharged automotive engine having a combustion chamber, introducing means for introducing air and fuel to said combustion chamber, and a supercharger for pressurizing charges of intake air introduced to said combustion chamber by the introducing means, said air/fuel control system comprising:

detecting means disposed in the engine for detecting a plurality of parameters representative of a condition under which the engine is operating and for issuing signals corresponding to said condition;

an air/fuel ratio regulating means operatively connected to the introducing means for regulating the ratio of air to fuel introduced by said introducing means to the combustion chamber;

supercharger operating means for rendering the operation of the supercharger effective and ineffective in the engine; and control means operatively connected to said detecting means for receiving the signals issued by said detecting means and for evaluating the signals, the control means operatively connected to said supercharger operating means for controlling said supercharger operating means to render the operation of the supercharger effective or ineffective based on the evaluation of the signals received, and the control means also operatively connected to said air/fuel ratio regulating means for controlling said air/fuel ratio regulating means to regulate said ratio to a predetermined value higher than the stoichiometric value when the control means controls said supercharger operating means to render the operation of the supercharger effective and the control means evaluates the signals as representative of a steady operating condition of the engine in which a predetermined maximum amount of engine output is required, and to regulate said ratio to a predetermined value that is lower than the stoichiometric value when the control means evaluates the signals to be indicative of an engine operating condition in which an amount of engine output is required that is greater than said predetermined maximum amount.

2. An air/fuel control system as claimed in claim 1, and further comprising supercharge relief control means operative when said control means controls said supercharger operating means to render the operation of the supercharger effective.

3. An air/fuel control system as claimed in claim 1, wherein said detecting means includes means for detecting a parameter indicative of a load imposed on the engine, and said control means controls said air/fuel ratio regulating means to regulate said ratio to a value lower than the stoichiometric value when said load is higher than a predetermined amount.

4. An air/fuel control system as claimed in claim 1, wherein said detecting means includes means for detecting a parameter indicative of the magnitude of the acceleration of the engine, and said control means controls said air/fuel regulating means to regulate said ratio to a value lower than the stoichiometric value when the magnitude of the acceleration of the engine is above a predetermined amount.

5. An air/fuel control system as claimed in claim 4, wherein said control means controls said air/fuel regulating means to regulate said ratio to a value that is lower than the stoichiometric value when the magnitude of the acceleration of the engine is above said predetermined magnitude of acceleration while the control means controls said supercharger operating means to render the operation of the supercharger effective, and to regulate said ratio to a value that is higher than the stoichiometric value when the magnitude of acceleration is below a predetermined amount while the control means controls said supercharger operating means to render the operation of the supercharger effective.

6. An air/fuel control system as claimed in claim 1, wherein said detecting means includes means for detecting a parameter indicative of the pressure of the air compressed by the supercharger, and said control means controls said air/fuel regulating means to regulate said ratio to a value higher than the stoichiometric value when said pressure is greater than a predetermined value while the control means controls said supercharger operating means to render the operation of the supercharger effective.

7. An air/fuel control system as claimed in claim 1, wherein said supercharger operating means comprises means for regulating the degree to which said supercharger compresses the intake air, and said control means includes feedback means for controlling said supercharger operating means to regulate the degree to which said supercharger compresses the intake air to a target value when the control means evaluates the signals as representative of said steady operating condition and controls said supercharger operating means to render the operation of said supercharger effective.

8. An air/fuel control system as claimed in claim 7, wherein a detector for detecting a parameter indicative of a load imposed on the engine is operatively connected to said control means, and said control means controls said supercharger operating to regulate the degree to which said supercharger compresses the intake air to a target value that increases linearly with an increase in the load imposed on the engine.

9. An air/fuel control system of a supercharged automotive engine having a combustion chamber, introducing means for introducing air and fuel to said combustion chamber, and a supercharger for pressurizing charges of intake air introduced to said combustion chamber by the introducing means, said air/fuel control system comprising:

detecting means disposed in the engine for detecting a plurality of parameters including one indicative of the load imposed on the engine and which parameters are representative of a condition under which the engine is operating, and for issuing signals corresponding to said condition;

an air/fuel ratio regulating means operatively connected to said introducing means for regulating the ratio of air to fuel introduced by said introducing means to the combustion chamber;

supercharger operating means for rendering the operation of the supercharger effective and ineffective in the engine; and control means operatively connected to said detecting means for receiving the signals issued by said detecting means and for evaluating the signals, the control means operatively connected to said supercharger operating means for controlling said supercharger operating means to render the operation of the supercharger effective or ineffective based on the evaluation of the signals received, and the control means operatively connected to said air/fuel ratio regulating means for controlling said air/fuel ratio regulating means to regulate said ratio to a predetermined value higher than the stoichiometric value when the control means controls said supercharger operating means to render the operation of the supercharger effective and the load imposed on the engine is less than a predetermined amount, and to regulate said ratio to a predetermined value that is lower than the stoichiometric value when the control means controls said supercharger operating means to render the operation of the supercharger effective and the load imposed on the engine is higher than said predetermined amount.

10. An air/fuel control system of a supercharged automotive engine having a combustion chamber, introducing means for introducing air and fuel to said combustion chamber, and a supercharger for pressurizing charges of intake air introduced to said combustion chamber by the introducing means, said air/fuel control system comprising:

detecting means disposed in the engine for detecting a plurality of parameters including one indicative of the load imposed on the engine and which parameters are representative of a condition under which the engine is operating, and for issuing signals corresponding to said condition;

an air/fuel ratio regulating means operatively connected to said introducing means for regulating the ratio of air to fuel introduced by said introducing means to the combustion chamber;

supercharger operating means for rendering the operation of the supercharger effective and ineffective in the engine; and control means operatively connected to said detecting means for receiving the signals issued by said detecting means and for evaluating the signals, the control means also operatively connected to said supercharger operating means and to said air/fuel ratio regulating means for controlling said supercharger operating means to render the operation of the supercharger ineffective while controlling said air/fuel ratio regulating means to regulate said ratio to a value higher than the stoichiometric value when the load imposed on the engine is less than a first predetermined load, for controlling said supercharger operating means to render the operation of the supercharger effective while controlling said air/fuel regulating means to regulate said ratio to a value higher than the stoichiometric value when the load on the engine is higher than said first predetermined load and lower than a second predetermined load, and for second predetermined load, and for controlling said air/fuel regulating means to regulate said ratio to a value that is lower than the stoichiometric value when the load imposed on the engine is higher than said second predetermined load.

11. An air/fuel control system as claimed in claim 10, wherein said control means controls said air/fuel regulating means to regulate said ratio to values higher than the stoichiometric value that increase with an increase in the load imposed on the engine between said first and said second predetermined loads.

12. An air/fuel control system as claimed in claim 10, wherein said detecting means includes means for detecting the acceleration of the engine, and said control means controls said supercharger operating means to render the operation of said supercharger effective when the engine is accelerated while the load imposed on the engine is below said first predetermined value.

13. An air/fuel control system as claimed in claim 11, wherein said detection means includes means for detecting a parameter indicative of the magnitude of acceleration of the engine, and said control means controls said air/fuel ratio regulating means to regulate said ratio to a value lower than the stoichiometric value when the magnitude of acceleration is greater than a predetermined value.

* * * * *